United States Patent
Lin

(10) Patent No.: US 9,852,248 B2
(45) Date of Patent: Dec. 26, 2017

(54) TRANSISTOR PLASMA CHARGING ELIMINATOR

(71) Applicant: Wallace W Lin, San Jose, CA (US)

(72) Inventor: Wallace W Lin, San Jose, CA (US)

( * ) Notice: Subject to any disclaimer, the term of this patent is extended or adjusted under 35 U.S.C. 154(b) by 0 days.

(21) Appl. No.: 14/856,579

(22) Filed: Sep. 17, 2015

(65) Prior Publication Data
US 2016/0179995 A1 Jun. 23, 2016

Related U.S. Application Data

(60) Provisional application No. 62/124,487, filed on Dec. 22, 2014.

(51) Int. Cl.
G06F 17/50 (2006.01)

(52) U.S. Cl.
CPC ...... *G06F 17/5063* (2013.01); *G06F 17/5036* (2013.01); *G06F 17/5009* (2013.01); *G06F 17/5072* (2013.01); *G06F 17/5081* (2013.01); *G06F 2217/02* (2013.01); *G06F 2217/12* (2013.01)

(58) Field of Classification Search
CPC ............ G06F 17/5081; G06F 17/5009; G06F 17/5072; G06F 2217/02; G06F 2217/12; G06F 17/5063; G06F 17/5036
See application file for complete search history.

(56) References Cited

U.S. PATENT DOCUMENTS

| | | | | |
|---|---|---|---|---|
| 5,600,578 | A * | 2/1997 | Fang | G01R 31/2621 324/762.09 |
| 5,726,458 | A * | 3/1998 | Bui | H01L 21/32137 257/204 |
| 6,414,358 | B1 * | 7/2002 | Lin | H01L 27/0255 257/356 |
| 6,566,716 | B2 * | 5/2003 | Lin | H01L 23/48 257/288 |
| 6,624,480 | B2 * | 9/2003 | Lin | H01L 27/0251 257/355 |
| 6,713,817 | B2 * | 3/2004 | Kitagawa | H01L 27/0629 257/360 |
| 6,747,471 | B1 * | 6/2004 | Chen | G01R 31/2856 324/750.05 |
| 6,862,723 | B1 * | 3/2005 | Wang | G06F 17/5081 716/112 |
| 7,114,140 | B2 * | 9/2006 | Ishikura | G06F 17/5072 257/E23.02 |
| 7,174,527 | B2 * | 2/2007 | Itou | H01L 22/14 257/E21.531 |

(Continued)

OTHER PUBLICATIONS

Shin et al. ; "Impact of plasma charging damage and diode protection on scaled thin oxide"; Year: 1993; Proceedings of IEEE International Electron Devices Meeting; pp. 467-470; Papers (17).*

(Continued)

*Primary Examiner* — Helen Rossoshek

(57) ABSTRACT

An integrated-circuit design tool system capable of minimizing a plasma induced charging effect to a transistor in a plasma-based process performed for a dielectric layer on a metal layer comprises a pre-processing unit, a charging evaluator engine, a charging eliminator engine, a post-processing unit, and a non-transitory computer readable medium.

14 Claims, 10 Drawing Sheets

(56) References Cited

U.S. PATENT DOCUMENTS

| | | | | |
|---|---|---|---|---|
| 7,952,392 B2* | 5/2011 | Koyama | ............. | H01L 27/1225 257/268 |
| 7,972,915 B2* | 7/2011 | Chen | ................... | H01L 21/8252 257/192 |
| 8,001,516 B2* | 8/2011 | Smith | ................. | G06F 17/5068 716/100 |
| 8,413,094 B2* | 4/2013 | Abadeer | ............. | G06F 17/5068 257/314 |
| 8,450,144 B2* | 5/2013 | Sakata | .............. | H01L 21/02554 257/E21.46 |
| 2002/0142526 A1* | 10/2002 | Khare | ............... | H01L 29/78612 438/152 |
| 2006/0225007 A1* | 10/2006 | Wang | ................. | G06F 17/5036 716/112 |
| 2012/0117519 A1* | 5/2012 | Parikh | ................ | G06F 17/5036 716/53 |
| 2013/0258784 A1* | 10/2013 | Lue | .................... | G11C 16/0483 365/185.18 |
| 2016/0179995 A1* | 6/2016 | Lin | .................... | G06F 17/5063 716/135 |
| 2016/0180010 A1* | 6/2016 | Lin | .................... | G06F 17/5081 716/112 |
| 2016/0180011 A1* | 6/2016 | Lin | .................... | G06F 17/5081 716/112 |
| 2016/0276229 A1* | 9/2016 | Lin | ........................ | H01L 22/14 |

OTHER PUBLICATIONS

Lin et al.; "Role of source/drain junction on plasma induced gate charging damage in N MOSFET"; Year: 2001 ; 2001 6th International Symposium on Plasma- and Process-Induced Damage (IEEE Cat. No. 01TH8538); pp. 112-115; Papers (8).*

* cited by examiner

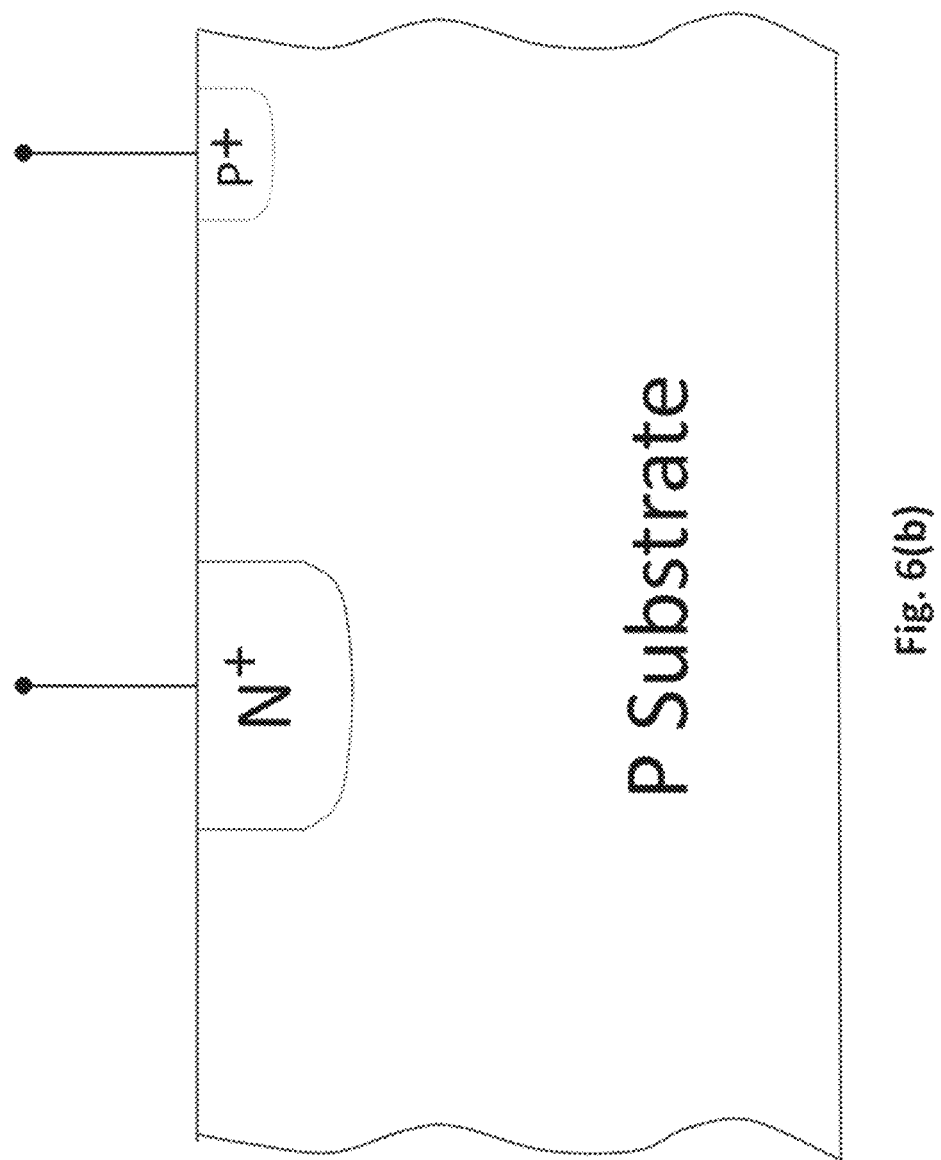

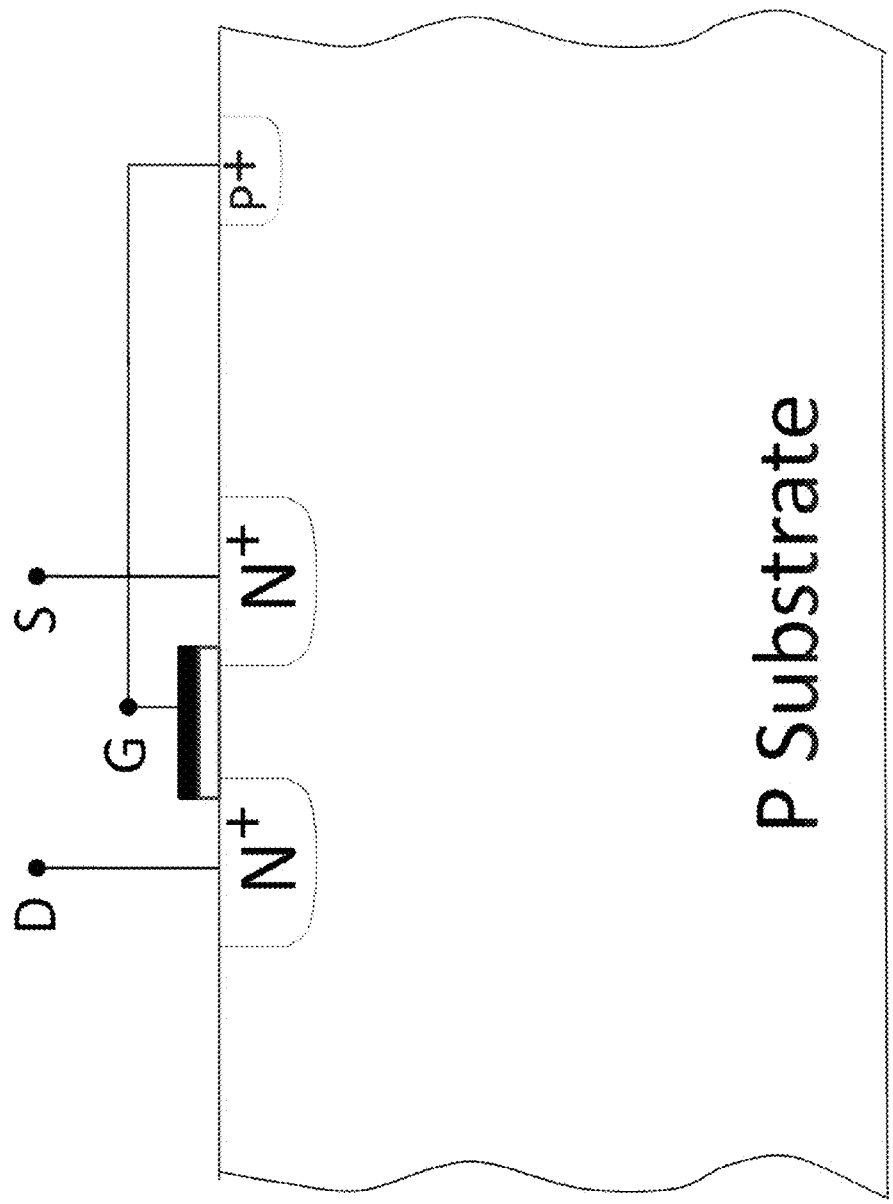

TRANSISTOR PLASMA CHARGING ELIMINATOR

CROSS-REFERENCE TO RELATED APPLICATION

This application claims the benefit of U.S. Provisional Application No. 62/124,487, filed on Dec. 22, 2014.

BACKGROUND

1. Technical Field

The present disclosure represents a computer aided design (CAD) tool that is capable of (i) detecting whether degradation of gate oxide in a metal-oxide-semiconductor (MOS) transistor will occur when such transistor is exposed to a plasma source during a plasma-based semiconductor integrated-circuit (IC) manufacturing process, and (ii) providing a solution to eliminating or minimizing such degradation. Given the internal and external conditions of the transistor located in the IC, the tool may simulate and evaluate plasma charging effect on such transistor during the plasma-based IC manufacturing process. These internal and external conditions may at least include the transistor internal physical features and external configuration and connectivity to interconnect metals, transistor process parameters, and parameters related to the plasma-based manufacturing process.

This disclosed tool will help device engineers improve transistor design, internally and externally, to attain more accurate and safe plasma charging design rules for circuit design. The tool will also help process engineers fine tune process recipes for minimizing plasma charging damages in transistor gate oxides. The tool will be helpful for equipment vendors in developing charging-minimized plasma-related semiconductor manufacturing equipments and processes in order to achieve better manufacturability and high yield for IC products.

2. Description of Related Art

Plasma process induced charging damages in gate oxide of transistors has long been a reliability concern in semiconductor industry. Such damage sometimes can cause failure in an entire product line during manufacturing process, incurring significant operating loss for business. The plasma charging phenomena are rather complicated because of involvement of many factors. For example, although the conditions of the plasma sources can obviously inflict the damage to transistor gate oxides, the process parameters and the internal and external physical features of the transistor itself can cause gate oxide damages as well in some cases even during a normal operating condition of a plasma source.

Though the problems have seen some alleviation in recent process technology nodes employing thin gate oxides, they continue to exist persistently. Such concern is more obvious and serious in particular for semiconductor foundries which run an array of different process nodes from the very old 0.35 μm to the very advanced sub-20 nm process. The wide span of the process nodes here requires the use of a broad range of gate oxide thickness including a range between 35 to 60 Å which, over the years during process technology development for silicon MOSFET transistors, has seen the most devastating plasma charging induced transistor degradation.

In the past several decades, it seems that there was not much synergy between the plasma-process equipment vendors, the foundries, and the individual semiconductor manufacturers in looking into the plasma charging related issues with a more comprehensive and systematic approach. The equipment vendors tackling such issues are probably lack of more adequate information on transistors under development by the foundries and the individual semiconductor manufacturers due to the latter being reluctant to give out proprietary transistor development information. On the other hand, the foundries and the individual semiconductor manufacturers, through tremendous efforts, must learn and perfect their knowledge in the characteristics of the plasma process equipments they acquired and then fine tune performance of the plasma equipments such that the transistors they made in their IC chips suffer less damages in their gate oxides. Such an approach in the industry has been extremely expensive due to the implementation and experimentation of the test devices in the manufacturing environment. The culprit of such situation may be attributed to the lack of an inexpensive means of understanding completely and providing solutions to this decade-long industry reliability problem. A simulation and evaluation computer-aided-design tool can offer a good solution to this. However, the tool must incorporate comprehensive physical models governing the plasma charging behaviors of the transistor. It has to be capable of accurately estimating the voltage across the transistor gate oxide under any internal and external process and device conditions of the transistor exposed to the plasma sources

SUMMARY

This disclosure is a CAD simulation tool aiming at the IC industry. The disclosed tool may first simulate and evaluate the plasma charging damage risk caused by the effect of the transistor's external interconnect metals design and the transistor's internal device and process design during IC backend plasma-involved metal patterning process. Based on evaluation results, the disclosed tool may provide a solution that can either eliminate or minimize such charging damage risk to the transistors. Since the evaluation may take into account the effect of the plasma loading characteristics of the plasma processing equipments, the disclosed tool may be used by the plasma equipment vendors to assess and enhance their plasma process equipments. Because the disclosed tool may also take into account the effect of device internal junctions and external connectivity as well, it should benefit the device and process engineers to fine-tune the process recipes and the transistor design. Circuit designers should be benefited too since the evaluation result of the charging damage risk together with the provided solution should help them design circuits with best possible charging-minimized interconnect layouts.

The core of this disclosed transistor plasma charging eliminator may include two simulation engines, one performing charging risk evaluation and the other providing solution to eliminate or minimize the corresponding charging risk. The engines may have incorporated latest most advanced multiple-terminal transistor charging models as well as comprehensive physical models governing transistor channel currents, transistor gate oxide currents, transistor internal currents in regions including source-to-substrate (or source-to-NW in the context of a PMOS transistor where NW denotes N-Well), drain-to-substrate (or NW) and NW-to-substrate junction, and depletion region underneath the gate channel. Numerical solving schemes that may solve complicated physics-related mathematical equations may also be implemented in the disclosed tool. A pre-processing unit of the tool may pre-process inputs describing characteristics associated with the plasma source, the transistor and the interconnect metals. A post-processing unit of the tool may be responsible for generating output information via both files and displays.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows:

FIG. 6(b) is a cross-sectional view of a N$^+$-P junction diode used in the charging free/minimization solution for the NMOS transistor according to one embodiment of the present disclosure; and FIG. 6(c) is a cross-sectional view of a NMOS gated diode used in the charging free/minimization solution for the NMOS transistor according to one embodiment of the present disclosure.

DESCRIPTION OF THE EXEMPLARY EMBODIMENTS

The aforementioned and other technical contents, features, and efficacies will be shown in the following detail descriptions of a preferred embodiment corresponding with the reference figures.

Figure 1:
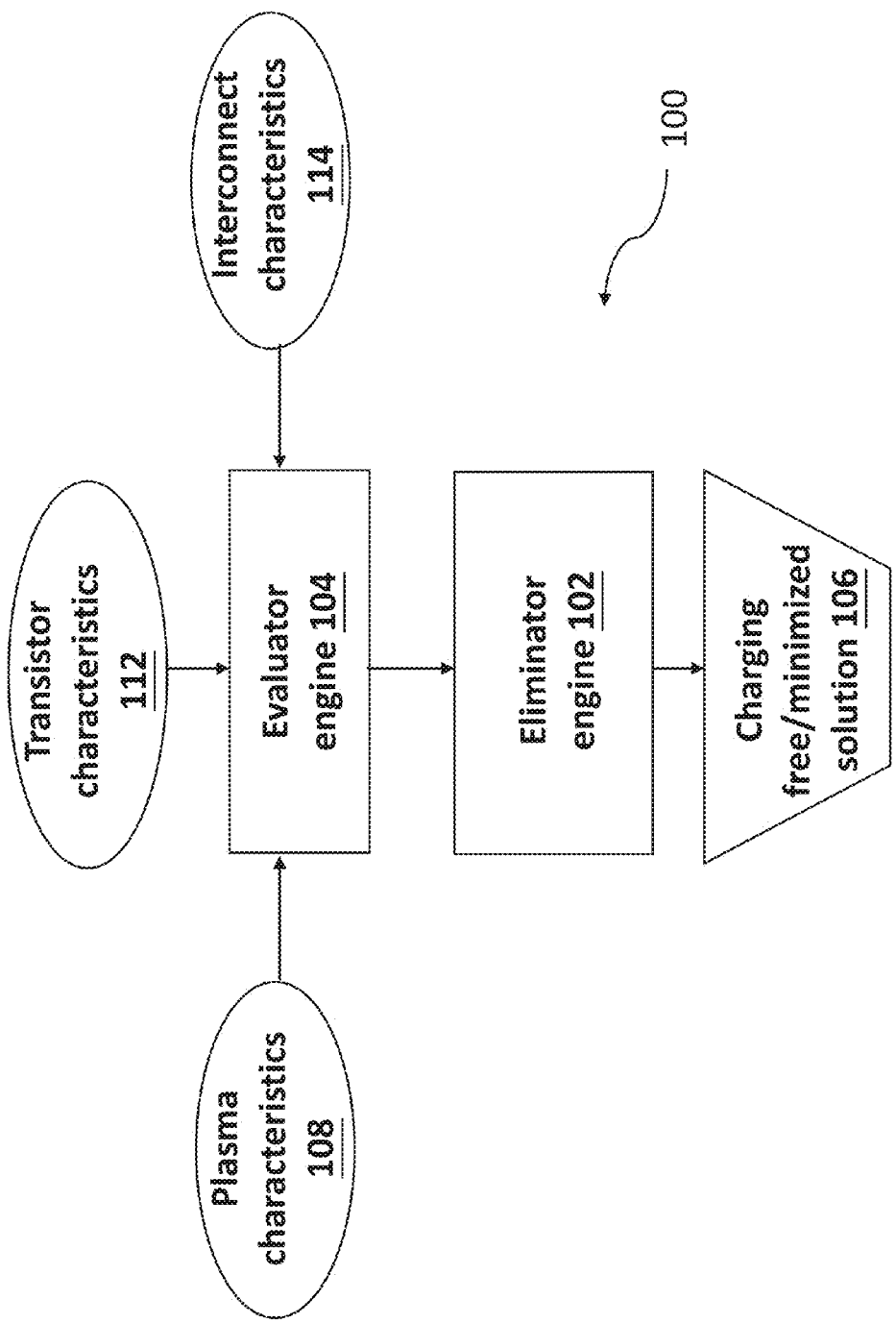
FIG. 1 shows a simplified block diagram of a plasma transistor charging eliminator according to one embodiment of the present disclosure.

FIG. 1 shows a simplified block diagram of a transistor plasma charging eliminator 100 according to one embodiment of the present disclosure. In FIG. 1, the transistor plasma charging eliminator 100 may include an eliminator engine 102 and an evaluator engine 104. The charging evaluator engine 104 may perform evaluation based on received inputs. Such inputs in one implementation may be provided from the users. In another implementation, the inputs may be received from another hardware/software component of the transistor plasma charging eliminator 100. The eliminator engine 102 may receive and process evaluation result and other necessary information from the evaluator engine 104 and derive at least one solution 106 that may eliminate or minimize corresponding charging damages to transistors. The charging evaluator engine 104 and the eliminator engine 102 together may constitute the disclosed transistor plasma charging eliminator 100. The charging evaluator engine 104 may be fed with inputs associated with three groups including parameters associated with the transistor, interconnects surrounding the transistor, and plasma source.

Both the charging evaluator and the eliminator engines 104 and 102 may incorporate comprehensive physical models governing the plasma charging behaviors of the transistors. The three groups of inputs received by the charging evaluator engine 104 as the pre-processor may include (i) the characteristics of the plasma source 108 that at least includes the polarity of the plasma, the plasma loading characteristics, and the plasma illumination intensity; (ii) the characteristics of the transistor 112, which at least includes the transistor type, the transistor internal and external physical features, the transistor leakage related parameters associated with its internal features, the transistor external connectivity and associated parameters, the transistor gate oxide thickness, and the leakage behavior and degradation threshold of the transistor gate oxide; and (iii) the characteristics of the interconnects 114 that at least include the number of the interconnect metal layers, the physical features of the interconnect metals, and the connectivity of the interconnect metal with the transistor and the property of the inter(-metal)-layer dielectrics (ILD).

The operation modes of the transistor during one plasma charging event may be determined by the above three groups of inputs 108-114. The physics-based simulation tool disclosed in the present disclosure may delineate precisely each of these operation modes by solving the transistor terminal voltages and currents versus the condition described in the three groups of inputs 108-114.

The charging evaluator engine 104 may perform the analysis based on the information provided from these three groups of the inputs 108-114. The charging evaluator engine may provide the analysis result as the output which in one implementation may be a group of parameters indicating the electrical potentials at the transistor gate, drain, source, and NW terminals in the case of PMOS. Based on these electrical potentials at various terminals, detailed information such as the potential drop across the transistor gate oxide along the transistor channel region and in the gate-to-source and gate-to-drain overlap region may be calculated. The eliminator engine 102 may then analyze these output information along with other necessary information from the charging evaluator engine 104 to derive the solution that would help eliminate or minimize the charging risk for the transistors.

The transistor plasma charging eliminator 100 may provide the analysis at two levels such as Level 1 and Level 2. At Level 1, along with the detailed inputs of the transistor, the interconnect surrounding the transistor (which may be referred to as interconnectivity in the present disclosure) and the plasma source, for each of the transistor terminals, the users may specify a single area value/size for the metal belonging to one particular interconnect metal layer that connects to terminals of this transistor. The transistor plasma charging eliminator 100 may perform the analysis and inform the users whether charging damage will occur to the transistor oxide. In the event of any charging damage may happen, the charging eliminator 100 may also provide the solution on how to fix the damage. At Level 2, the users may be further allowed to specify a range of the metal area values at each of the transistor terminals for a particular interconnect metal layer connected to this transistor terminals. The transistor plasma charging eliminator 100 may report whether the area range of the interconnect metals provided by the users is appropriate or not. If the provided is not appropriate, the transistor plasma charging eliminator 100, based on the original user-specified metal area range, may provide the user with best available alternatives that would help eliminate or minimize the charging damage.

Figure 2:
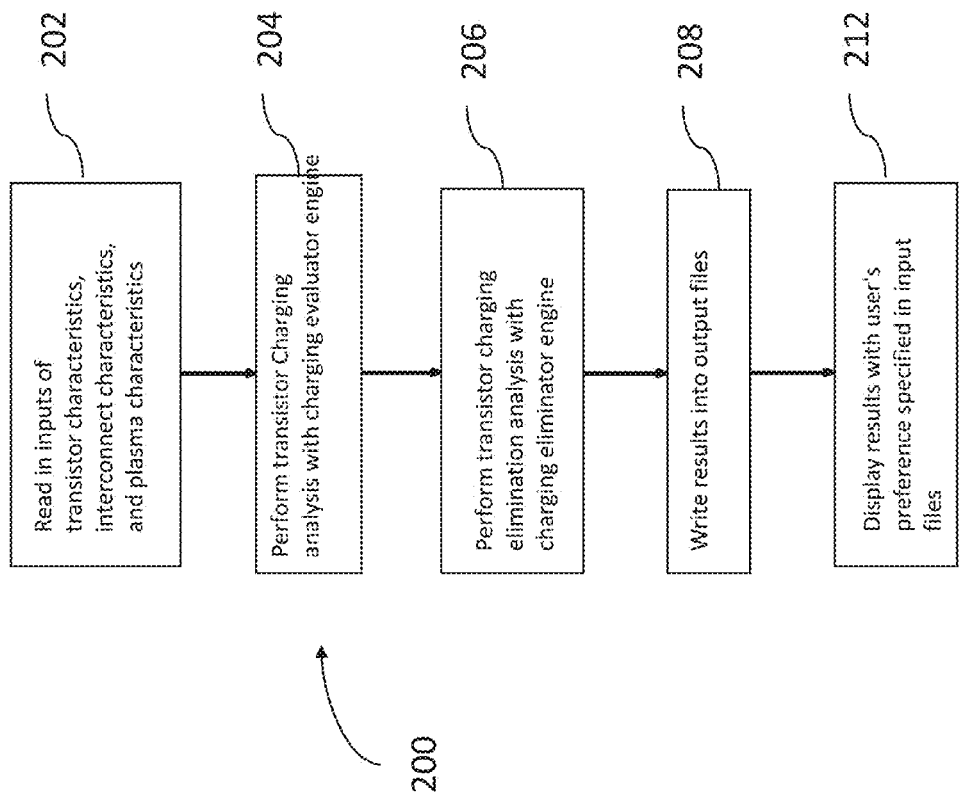
FIG. 2 shows a simplified block diagram of an operation flow of the plasma transistor charging eliminator according to one embodiment of the present disclosure.

FIG. 2 is a simplified block diagram describing an operation flow 200 of the transistor plasma charging eliminator according to one embodiment of the present disclosure. The transistor plasma charging eliminator may be run on a LINUX, UNIX, or other operating systems-based computer. Once the user readies the input file by filling in the required input information associated with the transistor, interconnect and plasma process, the charging eliminator may start performing by at least reading in the input file (step 202). The charging eliminator may begin one evaluation task by causing the evaluator engine as the pre-processor to perform when at least three above-mentioned categories of the inputs are read in (step 204). Once the evaluation task is completed, the evaluation results may be delivered to the eliminator engine. The eliminator engine may perform the corresponding analysis to derive the best available alternative to eliminate or minimize the charging risk for the transistors by following the execution sequence described in FIGS. 3 to 6 for P-MOSFET and N-MOSFET transistors under positive ("+") and negative ("−") charging events (step 206). The charging eliminator may also output and display the results of the analysis, based on the user's preference specified in the input file (steps 208-212).

The evaluator engine may automatically assign initial guesses of the voltages at the transistor's gate, source, drain and NW terminals. The inputs associated with the transistor, plasma source and ILD, in conjunction with initially-guessed voltages at the transistor terminals, may enable the computation for charging currents at the transistor terminals, and in the transistor gate oxide and the transistor internal source, drain and NW-to-substrate junctions (in the PMOS case). Voltages at the respective transistor terminals may be obtained iteratively until they converge. Potential drops across the gate oxide may be then computed in the forms of Vgs, Vgd, Vgc and Vgnw (in the PMOS case) representing the potential drop in the transistor gate-to-source and gate-to-drain gate-oxide overlap region, the potential drop in the transistor gate-to-channel gate-oxide region and the potential drop between the transistor gate and NW terminal.

Figure 4:
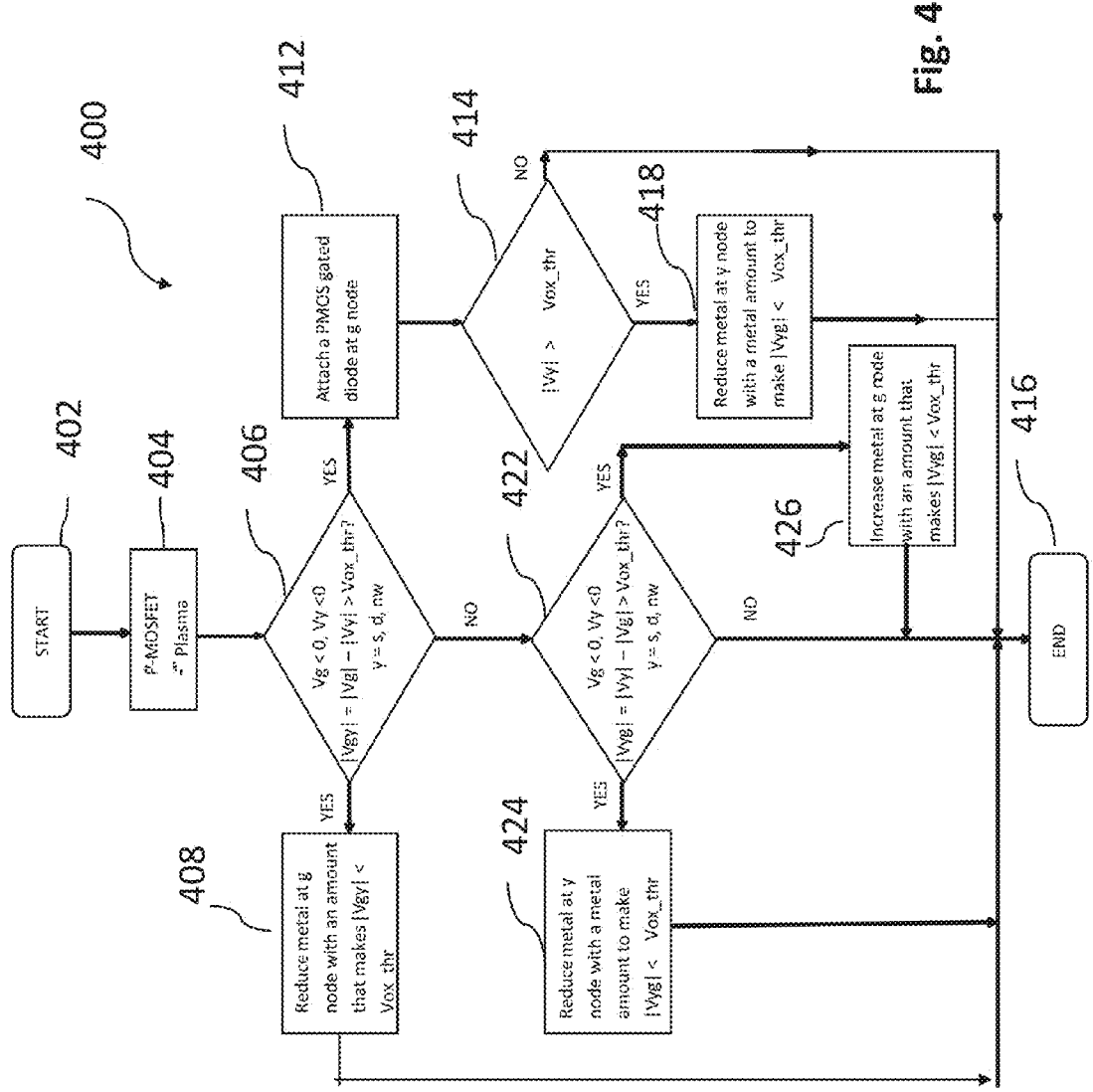
FIG. 4 is a simplified block diagram describing an operational flow of the plasma charging eliminator for a P-MOSFET transistor under a "−" plasma charging event where the potential at all transistor terminals are negative in value according to one embodiment of the present disclosure.
Figure 5:
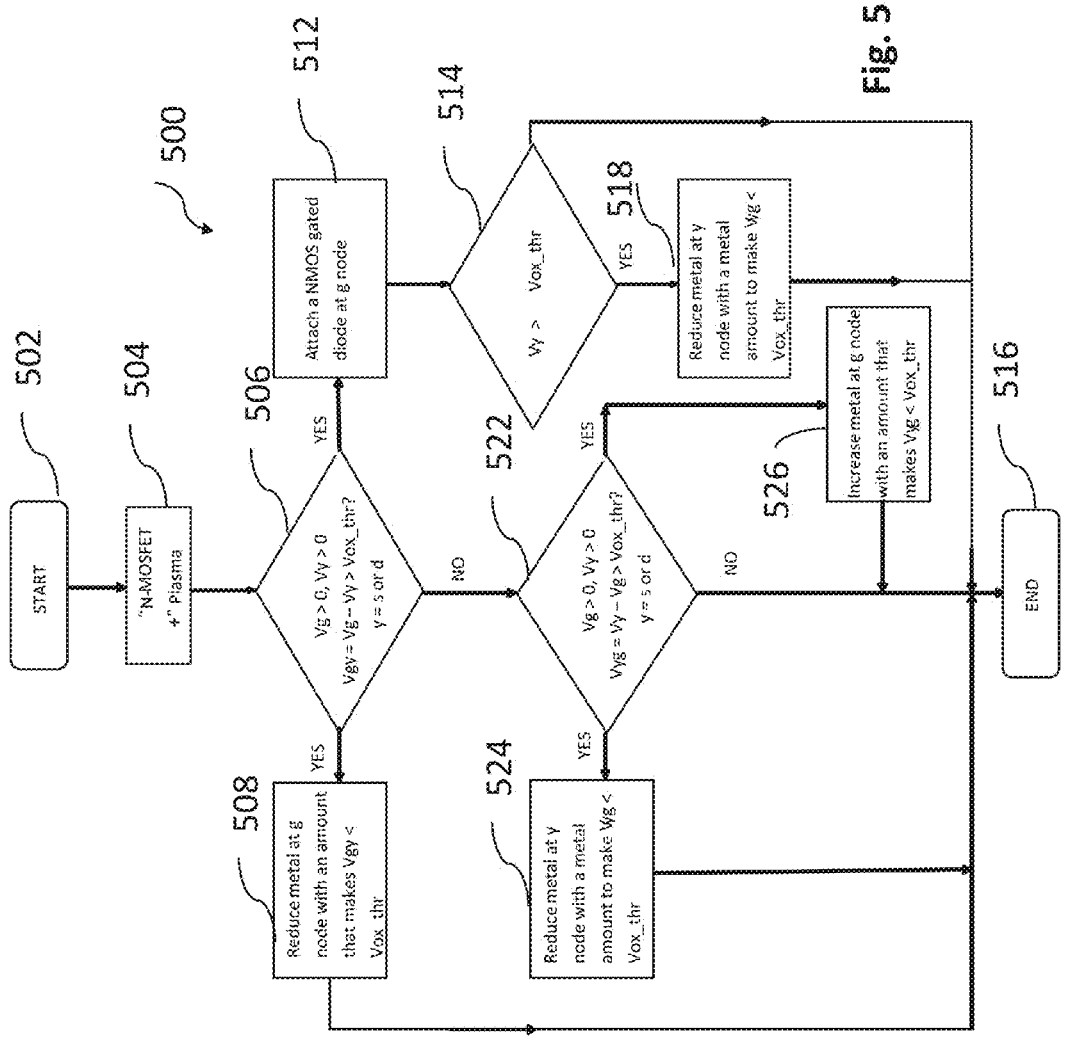
FIG. 5 illustrates a simplified block diagram of an operation flow of the transistor plasma charging eliminator according to the present disclosure dealing with the NMOS transistors under the "+" charging event according to one embodiment of the present disclosure.

With the results obtained from the evaluator engine as the pre-processor, the charging eliminator engine in FIG. 1 may begin its analysis. FIGS. 3 to 6 are simplified block diagrams explaining the operation of the charging eliminator engine according to one embodiment of the present disclosure. FIGS. 3 and 4 describe the P-MOSFET transistor under the "+" and "−" plasma charging events, respectively. FIG. 4 shows the embodiment where the potentials at all terminals are negative in value. FIGS. 5 and 6 meanwhile describe the N-MOSFET transistor under the "+" and "−" plasma charging events, respectively.

The comprehensive study associated with the transistor plasma charging evaluator have yield the conclusions that form the knowledge basis on how this presently disclosed transistor plasma charging eliminator may eliminate or minimize the charging damage risk for the transistors in the IC and test chips during layout design stages. One rule derived from this knowledge base is that during the charging events, the potential at one transistor terminal would be higher if the amount or area of the metal connected to that terminal is larger. Such effect becomes opposite if the amount or area of the metal connected to the transistor terminal is smaller. Thus, when the potential at the top side (e.g., the gate terminal) of the transistor is higher than that at the bottom side (i.e., source, drain and/or NW terminals) of the transistor, decreasing the metal area at the top-side terminal or increasing the metal area at the bottom-side terminals may help reduce the potential drop between the top and bottom side of the transistor. On the other hand, when the potential at the bottom side of the transistor is higher than that at the top side of the transistor, decreasing the metal area at the bottom-side terminals or increasing the metal area at the top-side terminal may help reduce the potential drop between the bottom and top sides of the transistor.

Another rule derived from the knowledge basis of the comprehensive study is that although placing a protection device such as a regular junction diode or a gated diode at the transistor terminal would pull down the potential of that particular terminal to be close to a substrate potential, however, the application of it would require extensive discretion since the result, greatly dependent on the polarity type of the junction diode and the plasma charging type, may backfire. For example, a complete opposite of the anticipated results may occur. Specifically, an $N^+$-P junction diode rather than a $P^+$-N junction diode would cause the potential at a terminal where this diode is connected during the negative plasma charging which results in the diode being in a forwarded-biased diode operation to be close to the substrate potential. When the potential of a transistor terminal is close to be the substrate potential, a large gate oxide current may begin flowing in an opposite direction which may subsequently damage the transistor gate oxide. This is a scenario completely defeating the purpose of using the protection diodes to protect the transistors in the charging events. In contrast, manipulating the metal area, and hence the potential buildup, at the transistor terminals for reducing the charging risk seems to be more controllable than employing with the junction diode, thus less likely to lead to the above mentioned catastrophic consequence via the diode protection.

Eliminating or minimizing the charging damage by the disclosed transistor plasma charging eliminator tool is based on the combination of the above two rules. Again, it is of most importance to note that one must be extremely careful when a protection diode is used. The protection diode may damage the transistor gate oxide if the absolute value of the potential at the opposite side of the protection node is greater than the degradation threshold of gate oxide. In such scenario, decreasing the metal area at the terminals on this opposite side may be necessary to eliminate or minimize the charging damage. Eliminating or minimizing the transistor charging damage for the PMOS transistors under the "+" and "−" charging events are captured and explained in the block diagrams shown in FIGS. 3 and 4 below, respectively.

Charging Eliminator on PMOS Transistors During "+" Charging Events

Figure 3A:
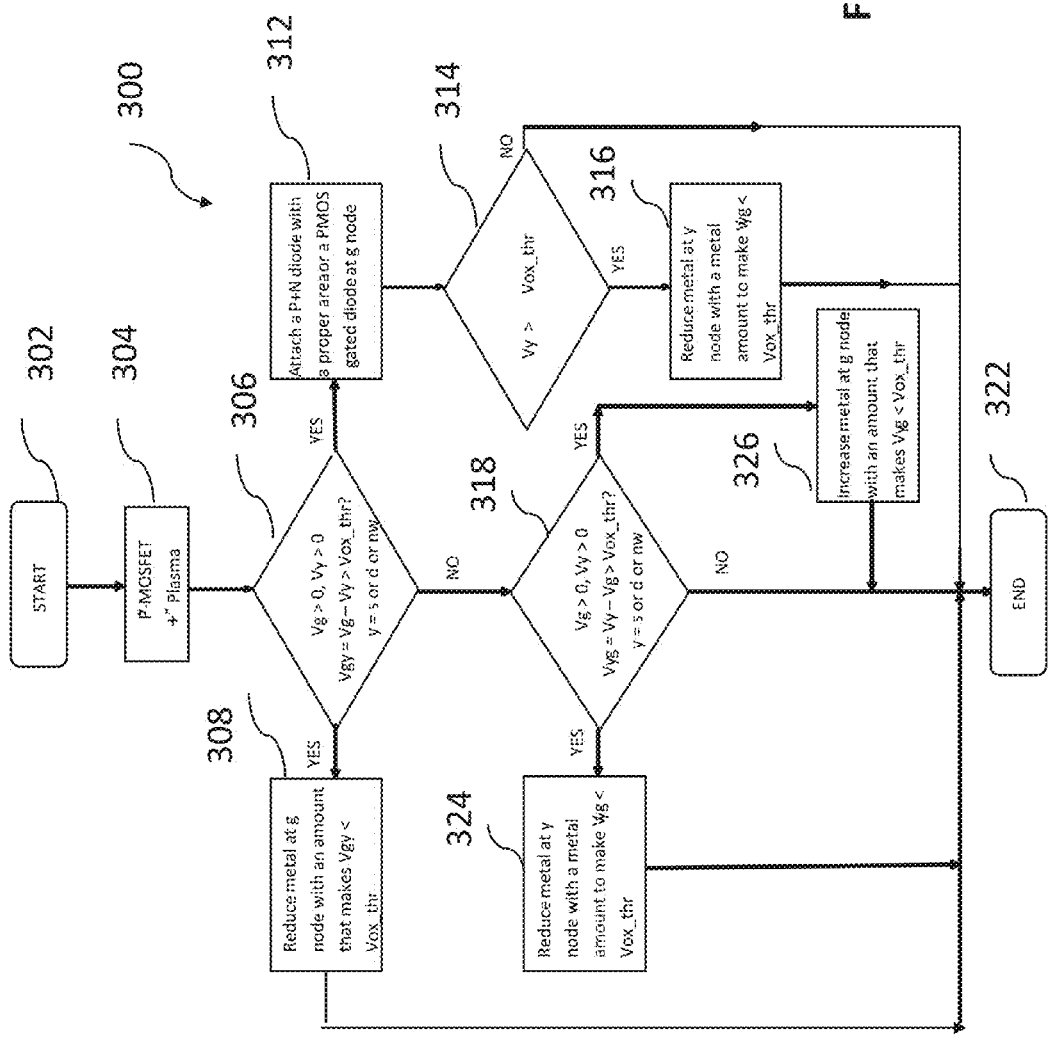
FIG. 3(a) describes a simplified block diagram of an operation flow of the transistor plasma charging eliminator for a P-MOSFET transistor under a "+" plasma charging event where the potential at all transistor terminals are positive according to one embodiment of the present disclosure.
Figure 3B:
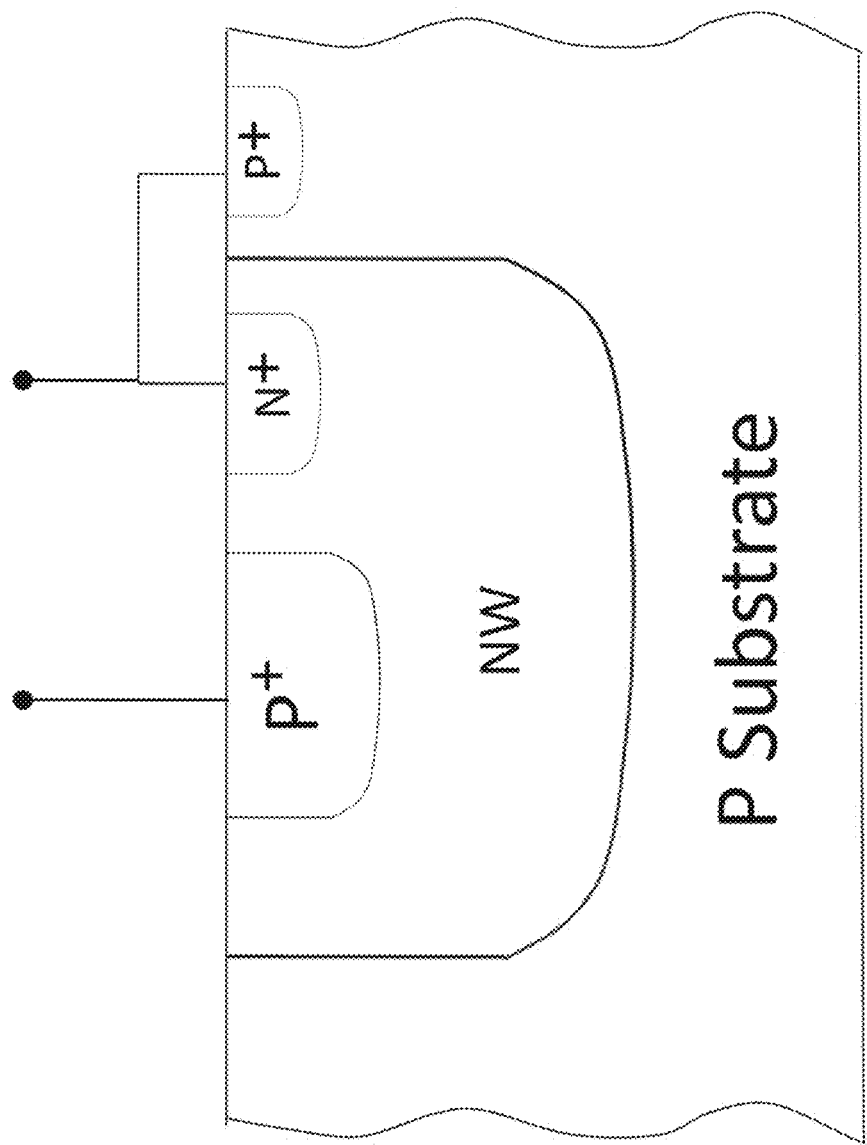
FIG. 3(b) shows a cross-sectional view of the suggested P+-N junction diode according to one embodiment of the present disclosure.

Please refer to FIGS. 3(a) and (b). A simplified block diagram in FIG. 3(a) describes an operation flow 300 of the transistor plasma charging eliminator for a P-MOSFET transistor under a "+" plasma charging event where the potential at all transistor terminals are positive according to one embodiment of the present disclosure. FIG. 3(b) shows a cross-sectional view of the suggested $P^+$-N junction diode according to one embodiment of the present disclosure.

Steps 302 and 304 may refer to the start of the operation flow 300 and confirmation of the "+" plasma charging event, respectively. The charging eliminator may thereafter check whether the potential at the top side of the transistor is greater than that at the bottom side and if difference in potential exceeds a gate oxide degradation threshold, Vox_thr (step 306). If that is the case, there is a risk that the gate oxide will be damaged during the "+" charging event. Based on the two rules mentioned above, there are at least two options to minimize the risk. One option is to reduce the metal area at the top side (i.e., at the transistor gate terminal) to an extent that may be calculated by the charging eliminator which will help lower the difference in potential between the top and bottom side terminals to be within a predetermined threshold (step 308). In one implementation, the predetermined threshold may be set as Vox_thr. The other option is to attach the protection diode (step 312). For example, a $P^+$-N diode may be placed at the transistor gate terminal in this "+" charging event. This $P^+$-N diode may be realized with a $P^+$-NW junction with NW tied to a wafer substrate. Note that the NW here should be a local one only for the diode itself. Tying a global NW, which is shared by many other devices, to the wafer substrate could be disastrous in circuit or test chip design. In addition, one must also be aware that attaching the protection diode may immediately fix the problem only if the absolute value of the potential at the bottom side terminals of the transistor, relative to the transistor substrate potential, is less than Vox_thr. If the absolute potential of those terminals is greater than Vox_thr, even the potential at the gate terminal (relative to transistor substrate potential) that approaches zero because of the protection diode will still damage the transistor gate oxide in the reverse-charging mode where a large charging current surges from the transistor bottom side into the top side if the potential difference between the bottom and top side terminals is greater than Vox_thr. Thus, the charging eliminator may analyze and confirm whether the absolute value of the bottom-side potential of the transistor is greater than Vox_thr immediately after a $P^+$-N diode is attached at the transistor top side (step 314). If the bottom-side absolute potential is less than Vox_thr, the problem-fix is completed. Otherwise, the area of the metal connected to the transistor bottom side may be reduced to a certain extent, which may be calculated by the charging eliminator such that the absolute potential difference between the transistor bottom and top side terminals may be less than Vox_thr (step 316).

When the absolute value of the potential at the transistor top side is not greater than that at the bottom side by an amount larger than Vox_thr, the charging eliminator may proceed to check the opposite scenario—whether the absolute potential at the transistor bottom side is greater than that at the top side by an amount larger than Vox_thr (step 318). If that is not the case, the charging eliminator may arrive at the conclusion that the P-MOSFET transistor is safe and free from the charging damage under the "+" plasma charging event, which may mark the end of the operation (step 322).

Otherwise, the transistor may be likely subject to damage to its gate oxide during the "+" charging event. And there are at least two options to fix this problem. One option as previously mentioned is to reduce the area of the metal connected to the transistor terminals at the transistor bottom side (i.e., transistor source, drain and NW terminals) to ensure that the absolute potential difference between these terminals and the gate is less than Vox_thr (step 324). Another option is to increase the area of the metal connected to the transistor gate terminal such that the absolute potential difference between transistor bottom terminals and the gate terminal becomes less than Vox_thr (step 326). The charging eliminator may determine and deliver the adjusted metal amount for those transistor terminals.

Figure 3C:
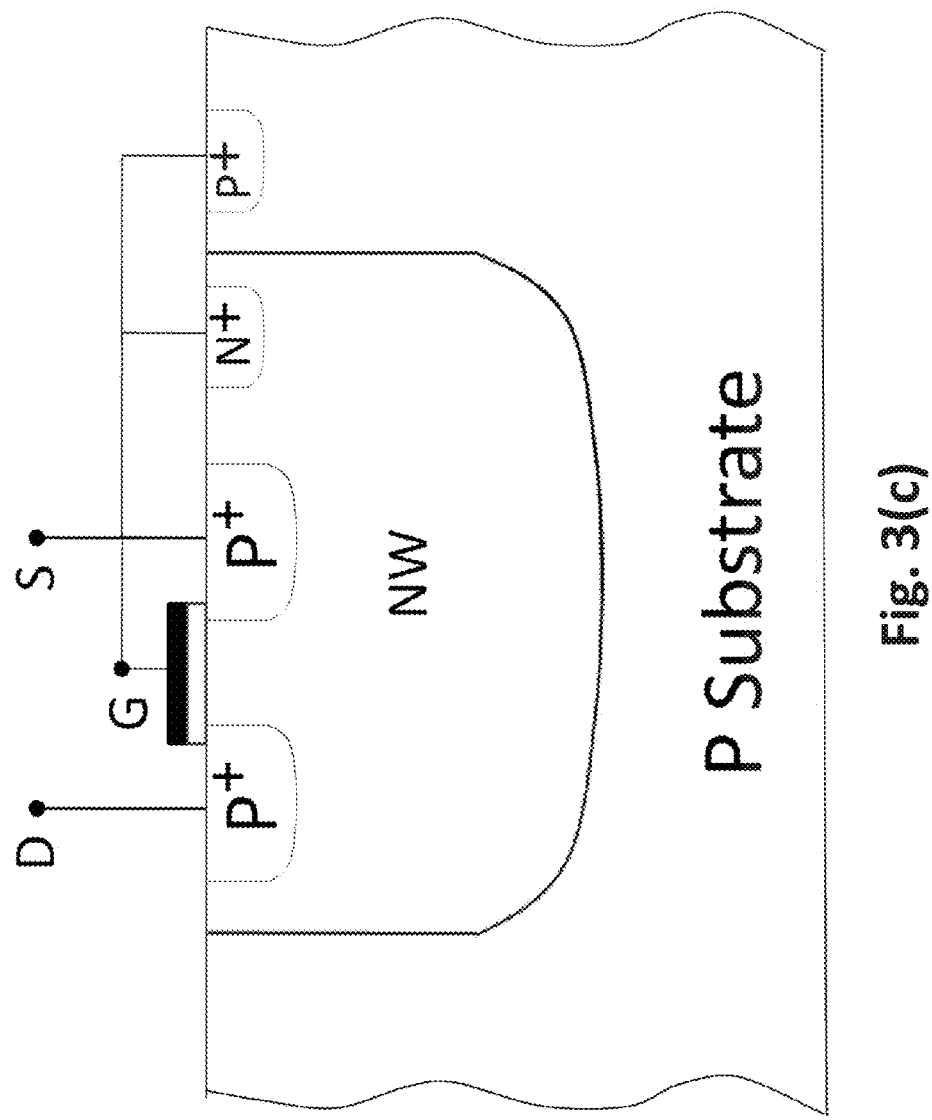
FIG. 3(c) depicts a cross-sectional view of the PMOS gated diode according to one embodiment of the present disclosure.

The operation flow of the charging eliminator in the "+" charging event is that the $P^+$-N diode described in FIG. 3(b) may be replaced with a gated diode formed by a P-MOSFET transistor with its gate tied to its source and the source tied to NW. Note that the NW of this PMOS gated diode must already tie to the substrate (i.e., the wafer substrate) of the PMOS transistor in this gated diode before the patterning process at the particular interconnect metal layer is performed so that the charging current can flow into wafer substrate. For example, for protecting the transistors during the Metal-3 patterning process, such connection between the NW of the PMOS gated diode and the wafer substrate must be made at Metal-2 layer or lower. Also it is important to note that a global turning off the sub-threshold leakage current of the PMOS transistor in the PMOS gated diodes during characterization in test chips or during circuit operation in circuit products is required in this gated-diode protection strategy. FIG. 3(c) depicts a cross-sectional view of the PMOS gated diode according to one embodiment of the present disclosure. The drain terminal of this PMOS gated diode may be connected to the protected transistor gate where the potential may be pulled low. During the "+" charging events, the forward-biased drain-to-NW junction of the PMOS gated diode may serve as a high leakage path to lower the potential at the terminal where the PMOS gated diode is attached. There is an advantage for using a gated diode versus a regular diode as the former can function as one two-way protection in both positive and negative charging events. This will be demonstrated and explained in the operation flow of the charging eliminator in the "−" charging events described next in FIG. 4.

Charging Eliminator on PMOS Transistors During "−" Charging Events

An operation flow 400 of the charging eliminator for the P-MOSFET transistor under the "−" plasma charging event according to one embodiment of the present disclosure is described in a simplified block diagram in FIG. 4. Under the "−" plasma charging event, all transistor terminals are negative in potential.

Steps 402 and 404 may refer to the start o the operation flow 400 and confirmation of the "−" plasma charging event, respectively. The charging eliminator may thereafter check whether the absolute value of the potential at the top side of the transistor is larger than that at the bottom side by an amount exceeding the gate oxide degradation threshold, Vox_thr (step 406). If so, it may be determined that there is a risk that the gate oxide will be damaged during the "−" charging event. Again, based on the two rules discussed above, at least two options may be used to fix the problem. One is to reduce the metal area at the top side (e.g., the gate terminal), to an extent to be calculated by the charging eliminator so that the absolute value of the potential difference between the top and bottom side terminals of the transistor may be lower than another predetermined threshold (step 408). In one implementation, the threshold may be Vox_thr. Another option is to attach the protection diode (step 412). A regular junction diode or a gated diode may be used as the protection diode. In theory, an $N^+$-P junction diode placed at the transistor gate terminal may be suitable for the "−" charging event because the $N^+$-P diode will be forward-biased and serve as a powerful leaky device during the event. However, in practice, one would encounter a difficult challenge if such $N^+$-P diode protection strategy is adopted. Unlike the "+" plasma charging case, an $N^+$-P diode placed at the gate of a P-MOSFET transistor would cause an operation failure for this transistor later during normal circuit operation following the chip manufacturing process where the plasma charging to the transistors occurs. The negative biases at the gate of the P-MOSFET transistors during the normal circuit operation would forward-bias the protection diode which will then pull up the transistor gate terminal potential to be approaching the potential of the transistor NW terminal which in circuit design usually is connected to a power supply bias such as VCC in CMOS logic. Consequentially, the P-MOSFET transistors would be turned off and functional failure of the circuit would occur. In contrast, the use of the $P^+$-N diode for the "+" plasma charging event in FIG. 3 would not have such circuit operation failure problem because the $P^+$-N diode placed at the transistor gate terminal would be reverse-biased with significantly large impedance at the transistor gate during the P-MOSFET transistor operation under CMOS logic. Thus, the above discussion concludes that an $N^+$-P junction diode cannot be placed at the P-MOSFET transistor gate terminal to eliminate or minimize charging damage to the gate oxide during the "−" charging events. A $P^+$-N junction diode that protects the PMOS transistors during the "+" charging events can stay there in terms of design despite it would not help charging protection during the "−" charging events due to the reversed-biased junction. In contrast, a PMOS gated diode not only will serve the purpose of protection for both "+" and "−" charging events but also avoid the P-MOSFET transistor functional failure during the normal circuit operation when a global leakage turning-off strategy for the PMOS gated diodes is in place in circuits or test chips. The forward-biased drain-to-NW $P^+$-N junction diode in the PMOS gated diode structure during the "+" charging events would serve the purpose of bringing down the potential at the transistor terminal where this PMOS gated diode is attached. The sufficient sub-threshold leakage current from the source to drain terminal of the PMOS gated diode during the "−" charging events would effectively pull down the potential too at the terminal where the PMOS gated diode is attached. The reverse-biased drain-to-NW junction during the normal circuit operation may function as one significantly high output impedance at the protected transistor gate, protecting the transistor from the functional failure in circuit operation. Therefore, comparing with a $P^+$-N junction diode that can only carry out one-way protection, a PMOS gated diode is able to serve as a two-way protection for the PMOS transistors during both "+" and "−" charging events, which is clearly a more flexible and decent candidate for plasma charging protection.

The charging eliminator may proceed to check whether the absolute value of the potential at the bottom-side terminals of the transistor is greater than Vox_thr immediately after the PMOS gated diode is attached at the transistor top side (step 414). If the absolute value of the bottom-side potential is less than Vox_thr, the problem-fix may be deemed completed (step 416). If the absolute value of the bottom-side potential is greater than Vox_thr, the area of the metal connected to the transistor bottom side terminals may be reduced to a certain extent (which may be calculated by the charging eliminator) such that the absolute value of the potential difference between the transistor bottom and top side terminals could be less than Vox_thr (step 418).

If the absolute value of the potential at the transistor top side is not larger than that at the bottom side by Vox_thr, the charging eliminator may continue checking the opposite scenario, which is whether the absolute potential at the bottom side terminals of the transistor is greater than that at the top side terminal by Vox_thr (step 422). If that is the case, the charging eliminator may consider the P-MOSFET transistor be safe and free from charging damage under the "+" plasma charging event. Otherwise, the transistor is likely subject to damage to its gate oxide during the "+" charging event. There are at least two options to prevent the damage from occurring. One option is to reduce the area of the metal connected to the transistor terminals at the transistor bottom side (i.e., transistor source, drain and NW terminals) to ensure that the absolute value of the potential difference between these terminals and the gate terminal is less than Vox_thr (step 424). Another option is to increase the area of the metal connected to the transistor gate terminal such that the absolute value of the potential difference between the bottom side terminals of the transistor and the gate terminal becomes less than Vox_thr (Step 426). The charging eliminator may be configured to determine and deliver the increased metal amount at each of the bottom-side terminals.

Charging Eliminator on NMOS Transistors During "+" and "−" Charging Events

For NMOS transistors exposed to the "+" or "−" charging events, eliminating or minimizing the charging damage may follow the similar logic and strategy adopted in the PMOS transistor case. The block diagrams in FIGS. 5 and 6(a) describe operation flows of the transistor plasma charging eliminator according to the present disclosure dealing with the NMOS transistors under "+" and "−" charging events, respectively.

In comparison, reciprocity may exist in the solution for the NMOS and PMOS transistor cases. The NMOS case under the "+" charging event may mirror the PMOS case under the "−" charging event, and the NMOS case under the "−" charging event may mirror the PMOS case under the "+" charging event because NMOS and PMOS transistors may be both driven into accumulation condition under the "−" and "+" charging events, respectively. They both may be driven toward the direction of inversion under the "+" and "−" charging events, respectively. Because of the reciprocity, one can simply interchange the "N" and "P" characters and flip the sign of the terminal voltages in the operation-flow block diagrams for the PMOS transistor case to arrive at the operation-flow block diagrams for the NMOS transistor case. In the NMOS case, the reciprocity may give rise to its charging-elimination or minimization operation flow being similar to the PMOS case despite some difference between the two. For the PMOS transistors under the "+" charging event, the NW terminals are floating due to positive charge buildup at the NW terminals which reverse-bias the junction between NW and the wafer substrate. This is different from the NMOS case under the "−" charging event where no NW terminal exists in the NMOS transistor and the wafer substrate is the substrate of the NMOS transistor, whereas the NW terminal is the substrate of the PMOS transistor. As a result, this may prompt the charging eliminator to deliver distinct solutions for PMOS transistors and NMOS transistors.

In FIG. 5, the operation flow 500 may start and confirm the simulation is for the NMOS transistor in the "+" plasma charging event (steps 502-504). The charging eliminator may thereafter check whether the absolute value of the potential at the top side of the transistor is larger than that at the bottom side by an amount exceeding the gate oxide degradation threshold, Vox_thr (step 506). If so, it may be determined that there is a risk that the gate oxide will be damaged during the corresponding "+" charging event. Again, based on the two rules discussed above, at least two options may be used to fix the problem. One is to reduce the metal area at the top side (e.g., the gate terminal), to an extent to be calculated by the charging eliminator so that the absolute value of the potential difference between the top and bottom side terminals of the transistor may be lower than another predetermined threshold (step 508). In one implementation, the threshold may be Vox_thr. Another option is to attach the protection diode (step 512). A gated diode may be used as the protection diode.

The charging eliminator may proceed to check whether the absolute value of the potential at the bottom-side terminals of the transistor is greater than Vox_thr immediately after the NMOS gated diode is attached at the transistor top side (step 514). If the absolute value of the bottom-side potential is less than Vox_thr, the problem-fix may be deemed completed (step 516). If the absolute value of the bottom-side potential is greater than Vox_thr, the area of the metal connected to the transistor bottom side terminals may be reduced to a certain extent (which may be calculated by the charging eliminator) such that the absolute value of the potential difference between the transistor bottom and top side terminals could be less than Vox_thr (step 518).

If the absolute value of the potential at the transistor top side is not larger than that at the bottom side by Vox_thr, the charging eliminator may continue checking the opposite scenario, which is whether the absolute potential at the bottom side terminals of the transistor is greater than that at the top side terminal by Vox_thr (step 522). If that is the case, the charging eliminator may consider the N-MOSFET transistor be safe and free from charging damage under the "+" plasma charging event. Otherwise, the transistor is likely subject to damage to its gate oxide during the "+" charging event. There are at least two options to prevent the damage from occurring. One option is to reduce the area of the metal connected to the transistor terminals at the transistor bottom side (i.e., transistor source and drain terminals) to ensure that the absolute value of the potential difference between these terminals and the gate terminal is less than Vox_thr (step 524). Another option is to increase the area of the metal connected to the transistor gate terminal such that the absolute value of the potential difference between the bottom side terminals of the transistor and the gate terminal becomes less than Vox_thr (Step 526).

Figure 6A:
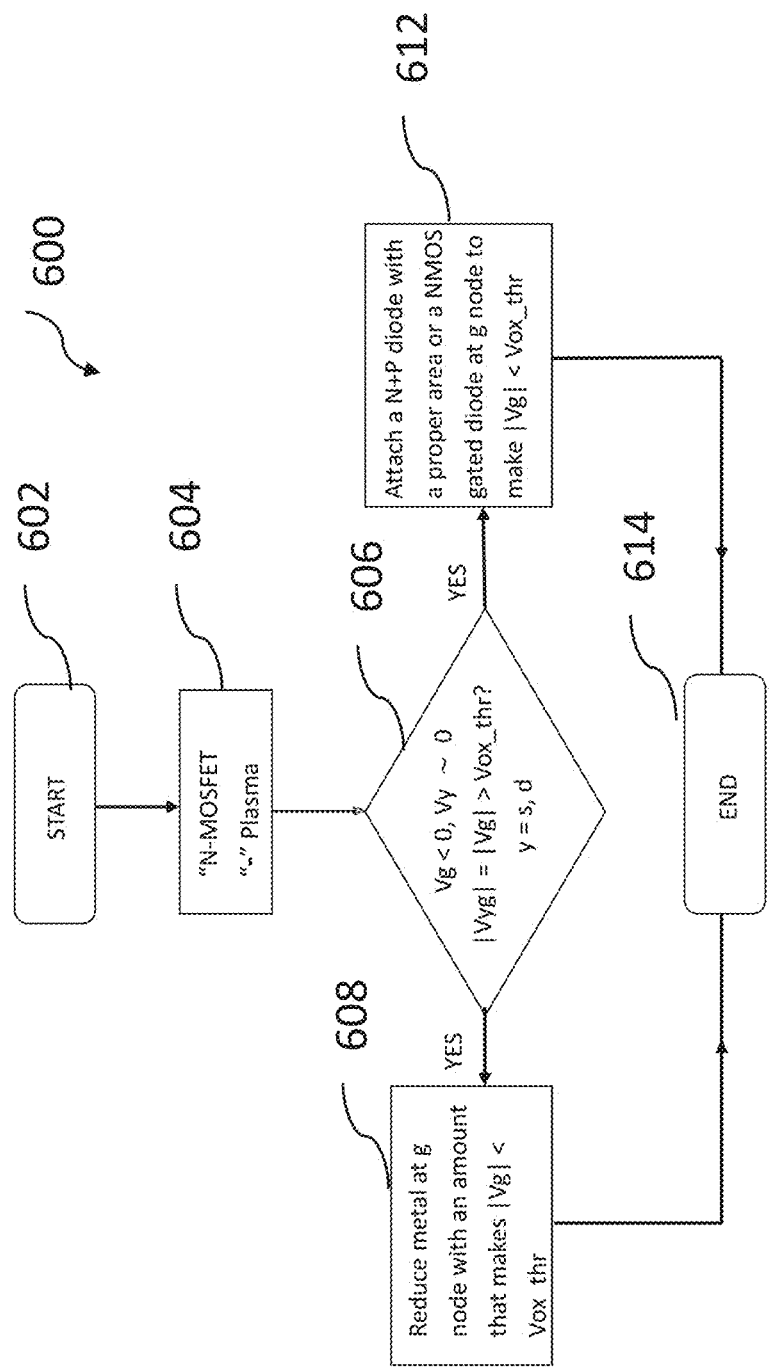
FIG. 6(a) illustrates a simplified block diagram of an operation flow of the transistor plasma charging eliminator according to the present disclosure dealing with the NMOS transistors under the "−" charging event according to one embodiment of the present disclosure.

An operation flow 600 shown in FIG. 6(a) may start and confirm the simulation is for the NMOS under the "−" charging event in steps 602 and 604, respectively. As the potential at the bottom side terminals of the transistor may be close to zero, and the top side terminal of the transistor may be negative in value, the operation 600 may determine whether the difference between the top side and bottom side terminals is greater than the gate oxide degradation threshold (step 606). If so, the operation 600 may proceed to suggest reducing the size of the metal connected to the top side terminal of the transistor, so as to lower the difference between the top side and bottom side terminals of the transistor to be less than the gate oxide degradation threshold in one implementation (step 608). Then the problem-fix may be deemed completed (step 614). Alternatively, the operation 600 may suggest an attachment of a $N^+$-P diode with a proper area size or a NMOS gated diode to the top side terminal of the transistor, which may also serve the purpose of reducing the difference between the top side and bottom side terminals to be less than the gate oxide degradation threshold in one implementation (step 612).

FIGS. 6(b) and 6(c) are the layout cross-sectional view for the $N^+$-P junction diode and the NMOS gated diode used in the charging free/minimization solution for the NMOS transistors described in FIGS. 5 and 6(a) respectively.

Performance of the disclosed transistor plasma charging eliminator may be demonstrated with the P-MOSFET transistors as the devices to be going through the entire simulation. The reason to use the PMOS transistors is because of its structure being more complicated than their NMOS counterparts with one more terminal (NW). As a result, more comprehensive physical effect in plasma-involved physical events may be expected.

A CMOS 6-metal-layer technology process is considered in the demonstration and process parameters associated with this technology process are used. The thickness of the transistor gate oxide is 30 Å with gate oxide degradation threshold of 2.5V. 5000 Å is used for the thickness of all ILD layers during the simulation. The short-circuit current density and open-circuit voltage of the plasma loading are 10-5 Amp/cm2 and 10V, respectively. Both the "+" and "−" plasma charging events are simulated. The area of the metal at the transistor gate, drain, source and NW terminals are all 10,000 μm². The simulation is performed at the beginning of the passivation deposition during the metal patterning process for the highest metal layer, i.e., Metal-6.

In the first demonstration example of a gate-floating case below, the NW-to-Substrate junction of the PMOS transistor may be intentionally shunted by a $P^+$-N junction diode which acts to pull down the NW potential during the "+" plasma event without having any significance during the "−" plasma event where the NW-to-Substrate junction is forward-biased and the $P^+$-N diode junction is reverse-biased.

In the second demonstration example of a gate-protected case, the NW-to-Substrate junction of the PMOS transistor is not shunted with a $P^+$-N junction diode.

Demonstration 1
Gate of P-MOSFET is Floating (i.e., No protection at Gate)
Results shown on screen:
******* P-MOSFET "−" Charging Analysis *******
Call P1chgNeg( )
P1chgNeg( ) Done !!!
DIAGNOSIS:
(Diagnosis file: report@peli−0.dat)
Vg Vs Vd −7.63539 −7.63538 −7.63538 V
Vgs Vgd −3.09324e−06 −3.09324e−06 V
Gate Oxide Degradation Threshold is 2.5V
Interconnect Design for "−" Charging is safe!!!
****************************************************
******* P-MOSFET "+" Charging Analysis *******
Call P1chgPos( )
P1chgPos( ) Done !!!
DIAGNOSIS:
(Diagnosis file: report@peli+0.dat)
Vg Vs Vd Vnw 3.26238 0.925981 0.925981 0.539166 V -continued

```
Vgs Vgd Vgnw 2.33639 2.33639 2.72321 V
Gate Oxide Degradation Threshold is 2.5 V
Interconnect Design for "+" Charging will fail!!!
Fix:
 - Reduce metal size at Gate terminal to 3.45e-05 cm2
   *Vgs will be 2.11767 V
   *Vgd will be 2.11767 V
   Vgnw will be 2.49984 V
     OR
 - Attach 1 standard-size (1µ m x 1µ m) p+n protection device at
   Gateterminal
   *Vgs will be -0.888977 V
   *Vgd will be -0.888977 V
   Vgnw will be -0.515653 V
*************************************************************
***P Eli Analysis Completed ***
```

Explanation

The charging eliminator may first goes through the simulation of the corresponding "−" charging event. The evaluator engine may run P1chgNeg( ) to perform an overall diagnosis. The analysis may help indicate all terminal voltages and between-terminal voltage drops. Comparing those voltages and difference thereof (voltage drops) with the gate oxide degradation threshold, the charging evaluator may conclude the transistor will be safe for the given condition during the "−" charging event.

The charging evaluator next may perform the simulation for the "+" charging event. All terminal voltages and between-terminal voltage drops may be determined through P1chgPos( ). Because Vgnw is 2.72321V, which is greater than the gate oxide degradation threshold of 2.5V, the charging evaluator may declare that the transistor will fail during the "+" charging event.

The charging eliminator may then attempt to fix the potential "fail" under the "+" charging event. It may determine that the problem may be fixed with at least two options. One is to reduce the metal area at the gate terminal of the transistor to $3.45*10^{-5}$ square centimeter from its original $10^{-4}$ square centimeter. Another option is to attach one standard $P^+$-N junction diode to the gate terminal of the transistor, which will reduce Vgnw to −0.515653 V from the original 2.72321 V. The size of the standard $P^+$-N junction diode in one implementation may be 1 µm×1 µm.

The content of "−" and "+" charging diagnosis files in one implementation may be presented below. Note that in the "−" charging event, the NW-to-Substrate junction is forward-biased and consequently the NW terminal is at the substrate potential, with the area of the metal at the NW terminal having no impact on transistor charging performance. This is the reason that the information related to the NW terminal is not shown in the diagnosis file.

```
Content of Diagnosis File ("−" Charging)
report@peli-0.dat
*************************************************************
PMOS "-" Charging
P+N PD @G N
Tox =  30.0   Degradation_Threshold = 2.5
As =   1.00000e+04 Ad =  1.00000e+04 Ag =  1.00000e+04
    Vg        Vs        Vd        Vgs         Vgd
-7.635387  -7.635384  -7.635384  -0.000003  -0.000003
Interconnect Design for "-" Charging is safe!!!
*************************************************************
```

```
Content of Diagnosis File ("+" Charging)
report@peli+0.dat
*************************************************************
PMOS "+" Charging
P+N PD @G N
Tox =  30.0   Degradation_Threshold = 2.5
As =   1.00000e+04 Ad =  1.00000e+04 Anw =  1.00000e+04 Ag =
   1.00000e+04
    Vg       Vs       Vd       Vnw       Vgs       Vgd
Vgnw 3.262376  0.925981  0.925981  0.539166  2.336395
2.336395  2.723210
Interconnect Design for "+" Charging will fail!!!
*************************************************************
```

```
Demonstration 2
Gate of P-MOSFET is connected to a P+-N junction diode (i.e.,
Protection at Gate)
Results shown on screen:
********* P-MOSFET "-" Charging Analysis *********
Call P1chgNeg( )
P1chgNeg( ) Done !!!
DIAGNOSIS:
(Diagnosis file: report@peli-1.dat)
Vg Vs Vd -0.396129 -3.61813 -3.61813 V
Vgs Vgd 3.222 3.222 V
Gate Oxide Degradation Threshold is 2.5 V
Interconnect Design for "-" Charging will fail!!!
Fix:
 - Reduce metal size at Source terminal to 8.45e-05 cm2
 - Reduce metal size at Drain terminal to 8.45e-05 cm2
   Vgs will be 2.46302 V
   Vgd will be 2.46302 V
*************************************************************
********* P-MOSFET "+" Charging Analysis *********
Call P1chgPos( )
P1chgPos( ) Done !!!
DIAGNOSIS:
(Diagnosis file: report@peli+1.dat)
Vg Vs Vd Vnw 0.409567 0.409574 0.409574 0.506215 V
Vgs Vgd Vgnw -6.53595e-06 -6.53595e-06 -0.0966471 V
Gate Oxide Degradation Threshold is 2.5 V
Interconnent Design for "+" Charging is safe!!!
*************************************************************
*** P Eli Analysis Completed ***
```

Explanation

During the "−" charging event, the gate terminal potential is pulled to be close to the substrate potential whereas the reverse-biased source-to-NW and drain-to-NW junctions may maintain the drain and source terminal potentials at their corresponding high levels. As a result, Vgs and Vgd, at 3.222V, appear to be higher than the transistor gate oxide degradation threshold, 2.5V. Therefore the charging evaluator may declare the transistor will fail in the "−" charging event.

For fixing the potential "fail," the charging eliminator engine may propose reducing the area of the metal at the source and drain terminals to $8.05*10^{-5}$ square centimeter from the original $10^{-4}$ square centimeter because the absolute value of the terminal potential at the transistor bottom side is higher than that at the top side by more than the transistor gate oxide degradation threshold.

For the "+" charging event, all between-terminal voltage drops, less than 0.1V in absolute value, are significantly lower than the transistor gate oxide degradation threshold. The charging evaluator hence may declares that the transistor will be safe under the given condition during the "+" charging event.

Listed below are the content of diagnosis files for the "−" and "+" charging event.

```
Content of Diagnosis File ("−" Charging)
report@peli−1.dat
***********************************************************
PMOS "−" Charging
P+N PD @G Y
Tox =   30.0   Degradation_Threshold = 2.5
As =    1.00000e+04 Ad =   1.00000e+04   Ag =   1.00000e+04
    Vg        Vs        Vd        Vgs       Vgd
−0.396129  −3.618128  −3.618128   3.221999   3.221999
Interconnect Design for "+" Charging will fail!!!
***********************************************************
```

```
Content of Diagnosis File ("+" Charging)
report@peli+1.dat
***********************************************************
PMOS "+" Charging
P+N PD @G Y
Tox =   30.0   Degradation_Threshold = 2.5
As =    1.00000e+04 Ad =   1.00000e+04   Anw =   1.00000+04  Ag =
    1.00000e+04
    Vg        Vs        Vd       Vnw       Vgs        Vgd
Vgnw 0.409567  0.409574  0.409574  0.506215  −0.000007  −
0.000007  −0.096647
Interconnect Design for "−" Charging is safe!!!
***********************************************************
```

It is worth noting that in the present disclosure though the P-MOSFET transistor is used to demonstrate the performance, capability and applications of the disclosed transistor plasma charging eliminator, such performance, capability and application may be equally applicable to other types of the transistors including the N-MOSFET transistors. The application includes, but not limited to, the silicon-based transistors.

The present disclosure may be practiced as a software invention, implemented in the form of a machine-readable medium having stored thereon at least one sequence of instructions that, when executed, causes a machine to effect the present disclosure. With respect to the term "machine," such term should be construed broadly as encompassing all types of machines, e.g., a non-exhaustive listing including: computing machines, non-computing machines, communication machines, etc. Similarly, with respect to the term "machine-readable," such term should be construed broadly as encompassing a broad spectrum of mediums, e.g., a non-exhaustive listing including: magnetic medium (floppy disks, hard disks, magnetic tapes, etc.), optical medium (CD-ROMs, DVD-ROMs, etc.), flash-based medium (EPROM Flash memories, EPROM Flash hard disks, etc.), etc.

Some modifications of these examples, as well as other possibility will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A computer-implemented method capable of minimizing a plasma-induced charging effect to a transistor of an integrated circuit design in a plasma-based process for a dielectric layer performed on a metal layer above the transistor, comprising:
   a non-transitory computer readable medium comprising
      a set of computer instructions when executed by a computer system
      causing the system to execute the tasks;
         a charging evaluator engine incorporating comprehensive physical models governing multiple-terminal transistor plasma-charging behaviors; the charging evaluator engine further comprising:
            receiving an input related to a transistor characteristics, a plasma characteristics and an interconnect characteristics; and
            performing charging evaluation analysis for the transistor by calculating a potential at a gate terminal and a remaining terminal including a source, drain and n-well terminal;
         a charging eliminator engine incorporating comprehensive physical models governing multiple-terminal transistor plasma-charging behaviors; the charging eliminator engine further comprising:
      calculating difference in potential between a gate terminal and a remaining terminal of the transistor;
      determining whether an absolute value of the potential at the gate terminal is larger than an absolute value of the potential at the remaining terminal and the difference in potential between the gate terminal and the remaining terminal exceeds a degradation threshold;
         preparing a first alternative requiring downsizing a metal area for the gate terminal, and a second alternative requiring attachment of a protection device to the gate terminal and determining a size parameter of the protection device
         when the absolute value of the potential at the gate terminal is larger than the absolute value of the potential at the remaining terminal and the difference in potential between the gate terminal and the remaining terminal exceeds the degradation threshold; and
   performing manufacturing process based on minimized plasma-induced charging effect to the transistor of the integrated circuit design.

2. The computer-implemented method according to claim 1, the charging eliminator engine further comprising determining whether the absolute value of the potential at the remaining terminal is larger than the degradation threshold after requiring the attachment of the protection device to the gate terminal.

3. The computer-implemented method according to claim 2, further comprising requiring downsizing the metal area for the remaining terminal when the absolute value of the potential at the remaining terminal is larger than the degradation threshold.

4. The computer-implemented method according to claim 2, further comprising determining the extent of downsizing the metal area for the gate terminal so as to ensure the difference in potential between the gate terminal and the remaining terminal is not larger than the degradation threshold.

5. The computer-implemented method according to claim 2, further comprising when the absolute value of the potential at the gate terminal is not larger than the absolute value of the potential at the remaining terminal but the difference in potential between the gate terminal and the remaining terminal exceeds the degradation threshold, preparing a third alternative requiring downsizing the metal area for the remaining terminal or a fourth alternative requiring upsizing the metal area for the gate terminal.

6. The computer-implemented method according to claim 2, further comprising determining the extent of downsizing the metal area for the remaining terminal in the third alternative or upsizing the metal area for the gate terminal in the fourth alternative so as to ensure the difference in potential between the gate terminal and the remaining terminal is not larger than the degradation threshold.

7. The computer-implemented method according to claim 2, further comprising receiving information indicating the potentials at the gate terminal and the remaining terminals of the transistor, wherein the information is prepared based on parameters relating to the transistor, parameters relating to an interconnection, and parameters relating to the plasma-based process.

8. A computer system capable of minimizing a plasma-induced charging effect to a transistor of an integrated circuit design in a plasma-based process for a dielectric layer performed on a metal layer above the transistor, comprising a transistor plasma charging eliminator, wherein the transistor plasma charging eliminator comprising:
a non-transitory computer readable medium comprising
a set of computer instructions when executed by the computer system
causing the system to execute the tasks;
a charging evaluator engine incorporating comprehensive physical models governing multiple-terminal transistor plasma-charging behaviors; the charging evaluator engine further comprising:
receiving an input related to a transistor characteristics, a plasma characteristics and an interconnect characteristics; and
performing charging evaluation analysis for the transistor by calculating a potential at a gate terminal and a remaining terminal including a source, drain and n-well terminal; and
a charging eliminator engine incorporating comprehensive physical models governing multiple-terminal transistor plasma-charging behaviors; the charging eliminator engine further comprising:
calculating difference in potential between a gate terminal and a remaining terminal of the transistor;
determining whether an absolute value of the potential at the gate terminal is larger than an absolute value of the potential at the remaining terminal and the difference in potential between the gate terminal and the remaining terminal exceeds a degradation threshold;
preparing a first alternative requiring downsizing a metal area for the gate terminal, and a second alternative requiring attachment of a protection device to the gate terminal and determining a size parameter of the protection device when the absolute value of the potential at the gate terminal is larger than the absolute value of the potential at the remaining terminal and the difference in potential between the gate terminal and the remaining terminal exceeds the degradation threshold; and
performing manufacturing process based on minimized plasma-induced charging effect to the transistor of the integrated circuit design.

9. The computer system according to claim 8, wherein the transistor plasma charging eliminator is further adapted to determine whether the absolute value of the potential at the remaining terminal is larger than the degradation threshold after requiring the attachment of the protection device to the gate terminal.

10. The computer system according to claim 9, wherein the transistor plasma charging eliminator is further adapted to require downsizing the metal area for the remaining terminal when the absolute value of the potential at the remaining terminal is larger than the degradation threshold.

11. The computer system according to claim 9, wherein the transistor plasma charging eliminator is further adapted to determine the extent of downsizing the metal area for the gate terminal so as to ensure the difference in potential between the gate terminal and the remaining terminal is not larger than the degradation threshold.

12. The computer system according to claim 9, wherein when the absolute value of the potential at the gate terminal is not larger than the absolute value of the potential at the remaining terminal but the difference in potential between the gate terminal and the remaining terminal exceeds the degradation threshold, the transistor plasma charging eliminator is adapted to prepare a third alternative requiring downsizing the metal area for the remaining terminal or a fourth alternative requiring upsizing the metal area for the gate terminal.

13. The computer-implemented method according to claim 9, wherein the transistor plasma charging eliminator is further adapted to determine the extent of downsizing the metal area for the remaining terminal in the third alternative or upsizing the metal area for the gate terminal in the fourth alternative so as to ensure the difference in potential between the gate terminal and the remaining terminal is not larger than the degradation threshold.

14. The computer-implemented method according to claim 9, wherein the transistor plasma charging eliminator is further adapted to receive information indicating the potentials at the gate terminal and the remaining terminals of the transistor, wherein the information is prepared based on parameters relating to the transistor, parameters relating to an interconnection, and parameters relating to the plasma-based process.

* * * * *